Aug. 19, 1958  V. G. KLEIN ET AL  2,848,255
LUBRICANT FITTING COUPLER WITH WEDGED LOCK RING
Filed March 24, 1955  2 Sheets-Sheet 1

Victor G. Klein,
Carl H. Mueller,
Inventors.
Koenig and Pope,
Attorneys.

Aug. 19, 1958 V. G. KLEIN ET AL 2,848,255
LUBRICANT FITTING COUPLER WITH WEDGED LOCK RING
Filed March 24, 1955 2 Sheets-Sheet 2
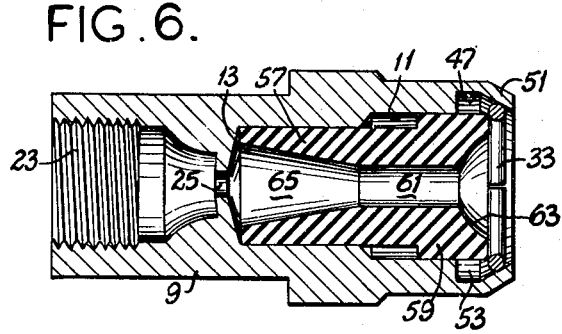
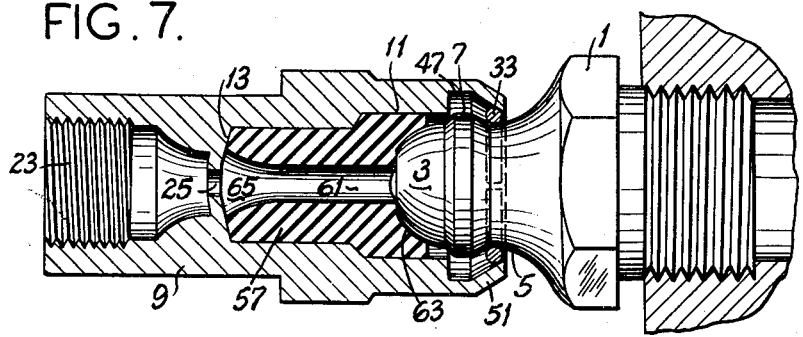
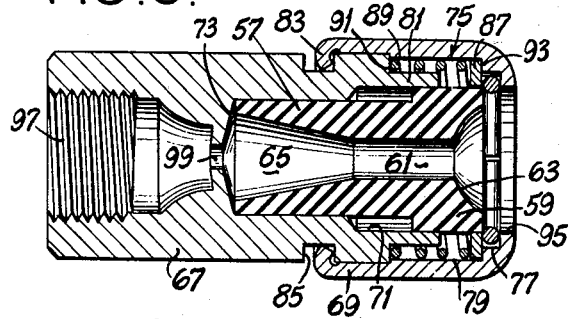
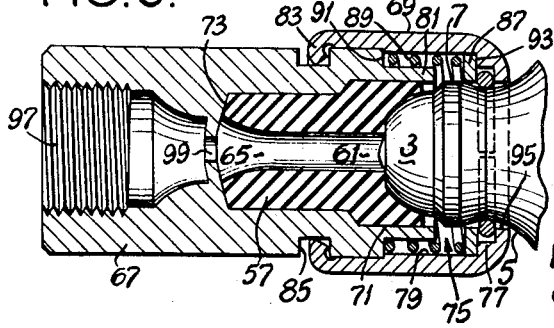
Victor G. Klein,
Carl H. Mueller,
Inventors.
Koenig and Poge,
Attorneys.

United States Patent Office 2,848,255
Patented Aug. 19, 1958

2,848,255

LUBRICANT FITTING COUPLER WITH WEDGED LOCK RING

Victor G. Klein, Defiance, and Carl H. Mueller, Pasadena Hills, Mo., assignors to The McNeil Machine & Engineering Company, Akron, Ohio, a corporation of Ohio Application March 24, 1955, Serial No. 496,527

3 Claims. (Cl. 285—267)

This invention relates to couplers, and more particularly to a coupler for permanently connecting a lubricant delivery line to a lubricant-receiving fitting.

Among the several objects of the invention may be noted the provision of an improved coupler for making a permanent connection between a lubricant delivery line, such as a plastic tube, and a lubricant-receiving fitting of a type such as is shown for example in U. S. Patent 2,400,817, the coupler being adapted for quick, easy application to a fitting without the use of any tools; the provision of a coupler of the class described which is adapted to make a lubricant-tight seal with the fitting; and the provision of a coupler of this class which is economical to manufacture. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a longitudinal section of a first form of the coupler;

Fig. 6 is a longitudinal section illustrating a coupler with further modifications;

Fig. 7 is a view like Fig. 4 showing the Fig. 6 coupler applied to a fitting;

Fig. 8 is a longitudinal section of another modification of the coupler; and,

Fig. 9 is a view like Figs. 4 and 7 showing the Fig. 8 coupler applied to a fitting.

Corresponding reference characters indicate corresponding parts throughout the several views of the drawings.

Figure 1:
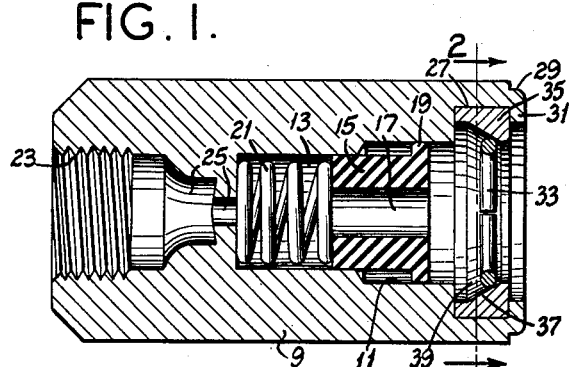
Figure 2:
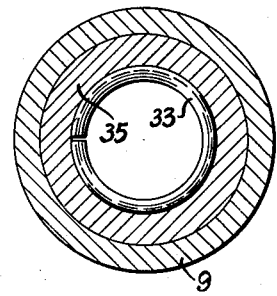
Fig. 2 is a transverse section take on line 2—2 of Fig. 1.

Referring to the drawings, Figs. 1–4 illustrate a coupler for connecting a lubricant delivery line (not shown) to a lubricant-receiving fitting 1. This fitting is of a conventional type, resembling that shown in U. S. Patent 2,400,817, having a coupler-receiving head 3 undercut at 5. More particularly, the head 3 is of generally flat truncated hemispherical form having an oppositely presented part-spherical bulge or collar 7 which converges spherically to the undercut portion or neck 5. Other details of the fitting are not essential to this invention, and may be ascertained from U. S. Patent 2,400,817.

The coupler shown in Figs. 1–4 comprises a cylindrical body 9 having a cylindrical socket 11 at one end (referred to as its forward end) for receiving the head 3 of the fitting 1. A cylindrical chamber 13 of smaller diameter than the socket 11 opens into the rearward end of the socket. The chamber and socket are coaxial. A cylindrical seat 15 has a sliding sealing fit in chamber 13. This seat, which is preferably made of a lubricant-resistant synthetic rubber, such as that sold under the trade name Hycar, has an axial lubricant passage 17. The seat projects forward out of the chamber 13 into the socket 11 and has a flange 19 at its forward end fitting in the socket. A compression spring 21 is interposed between the rearward end of the chamber 13 and the seat 15.

The rearward end of the body 9 has a threaded socket 23 for receiving an end of a lubricant delivery line, such as a length of flexible plastic tubing, and a conventional compression nut (not shown) for securing the end of the delivery line in the socket 23. From the inner end of the socket 23, a lubricant passage 25 of smaller diameter than chamber 13 leads into the chamber.

In manufacturing the body 9, a counterbore 27 is provided at its forward end. The forward end of the body 9 is reduced on its exterior as indicated at 29 to provide a relatively thin annular lip 31 at the forward end of the body. A split resilient ring 33 and a bushing 35 are located in the counterbore 27, after which the lip 31 is spun inward against the outer end of the bushing to hold it and the split ring in place in the counterbore. The internal surface of the bushing flares in rearward direction as indicated at 37. This provides an internal annular recess 39 in the body 9 surrounding the outer end of the socket 11. The periphery 37 of the recess (the internal surface of the bushing) flares in the direction away from the outer end of the socket. The split ring 33 is located in the recess 39. The ring 33 when unstressed (Fig. 1) has an outer diameter larger than the inside diameter of the recess 39 (the internal diameter of the bushing 35 at its outer end) and smaller than the outside diameter of the recess (the internal diameter of the bushing 35 at its inner end). The inside diameter of the ring 33, when the ring is unstressed, is smaller than the inside diameter of the recess. Expansion of the ring is permitted by moving it toward the large end of the recess (to the left as viewed in Fig. 1).

The internal diameter of the bushing 35 at its outer end is slightly greater than the diameter of the collar 7 of the particular size of fitting 1 to which the coupler is to be attached. When the cylindrical seat 15 is in the forward position shown in Fig. 1 with spring 21 uncompressed, the distance from the outer end of the recess 39 to the forward face of the seat is somewhat less than the distance from the flat end of the head 3 of the fitting to the juncture 41 of the collar 7 and the neck 5 of the fitting.

Figure 3:
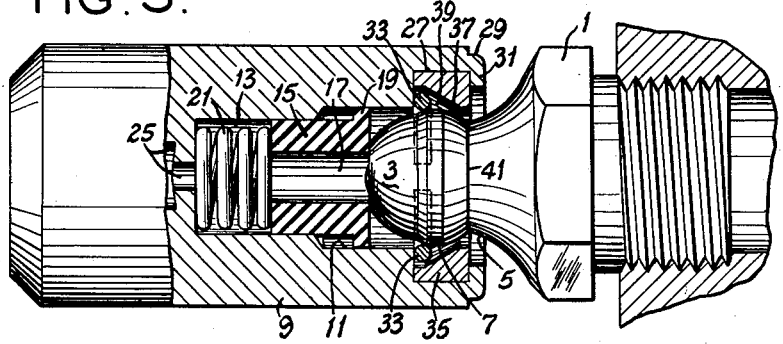
Fig. 3 is a view partly in elevation and partly in section showing the coupler in an intermediate stage of application to a fitting.
Figure 4:
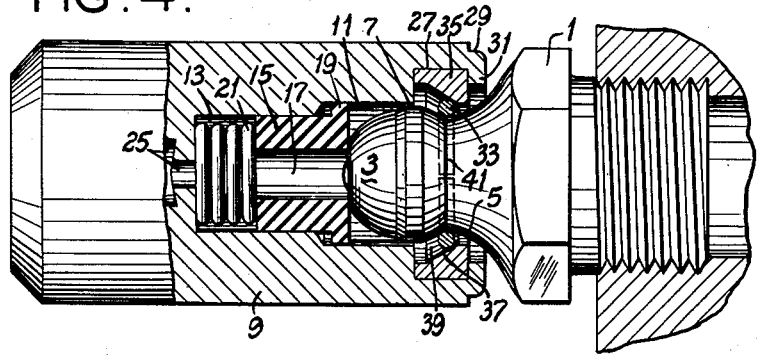
Fig. 4 is a view similar to Fig. 3 showing the coupler as finally applied to a fitting.

The coupler is applied to the head 3 of the fitting 1 by entering the head in the socket 11 and simply pushing the coupler forward. As this occurs, the split ring 33 is forced by the collar 7 to the rearward end of the recess 39 and expanded radially outward, as shown in Fig. 3. The flat end of the head 3 comes into engagement with the forward end of the cylindrical seat 15, and the seat is forced rearward, thereby compressing the spring 21. When the coupler has been pushed forward to the point where the split ring 33 rides past the collar 7 of the head, the ring contracts upon the undercut portion or neck 5 of the fitting. This locks the coupler on the head of the fitting in the position shown in Fig. 4, wherein the cylindrical seat 15 has been forced rearward to a point where the spring 21 is sufficiently compressed to exert a strong bias on the seat, holding it in lubricant-tight engagement with the flat end of the head of the fitting. Any tendency for the coupler to come off the head of the fitting is resisted, due to the fact that, upon relative separating movement of the coupler and the fitting, the split ring is contracted or wedged by the flaring periphery 37 of the recess 39 more tightly to lock together the coupler and the fitting.

Figure 5:
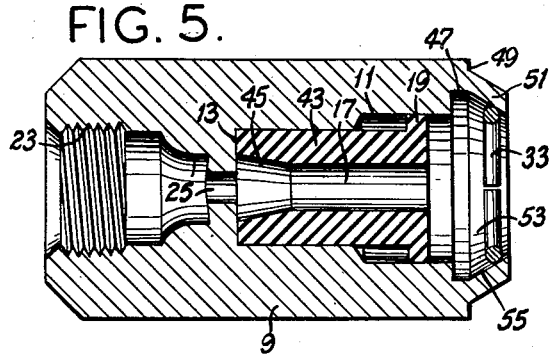
Fig. 5 is a longitudinal section similar to Fig. 1 illustrating certain modifications of the coupler.

Fig. 5 illustrates another embodiment of the coupler, having two modifications in respect to the coupler shown in Figs. 1–4. The first of these modifications involves the elimination of the spring 21 and the provision of a cylindrical seat 43 which is longer than the seat 15. The seat 43 has its rearward end engaging the rearward end of the chamber 13 and is itself resilient, being made of synthetic rubber or the like. Upon application of the coupler to a fitting, the seat member 43 is axially compressed to provide the lubricant-tight seal with the head of the fitting. The rearward end of the lubricant passage 17 in the seat 43 may be flared, as indicated at 45, in order to increase the compressibility of the seat.

The second modification illustrated in Fig. 5 involves the elimination of the bushing 35. According to this modification, the body 9 is formed with a counterbore 47 at its forward end. The forward end of the body is reduced on its exterior as indicated at 49 to provide a relatively thin lip 51 which is longer than the lip 31 of Figs. 1–4. After the split ring 33 has been entered in the counterbore the lip 51 is spun inward to a conical form, to provide a recess 53 with a periphery 55 flaring in rearward direction. The Fig. 5 coupler is applied in the same manner as the coupler shown in Figs. 1–4.

Fig. 6 illustrates another modification constituting a coupler of this invention. This is generally similar to the Fig. 5 coupler, the essential difference being that the cylindrical seat, designated 57 in Fig. 6, is made longer than the seat 43 of Fig. 5. The seat 57 has its rearward end portion received in the chamber 13 with a tight fit, and has an enlarged outer or forward end portion 59 received in the socket 11. Prior to compression upon application of the coupler to a fitting, the seat 57 is of such length as to extend from the inner end of the chamber 13 to near the outer end of the recess 53. The outer or forward end of the seat 57 engages the split ring 33 and holds it against the conical lip 51 at the outer or forward end of the recess 53 and in a plane substantially at right angles to the axis of socket 11. This prevents the ring from becoming skewed and possibly impeding the application of the coupler to a fitting. The seat 57 is made of resilient compressible material, and has a lubricant passage 61 corresponding to passage 17. In the forward end of the seat is a recess 63 shaped to receive the end of the head 3 of a fitting. The rearward end of passage 61 has a flare 65 which is considerably longer than the flare 45 to make the seat compressible to the extent required for application of the coupler to a fitting as illustrated in Fig. 7.

Fig. 8 illustrates still another modification constituting a coupler of this invention adapted to prevent the coupler from being twisted off a fitting, as may sometimes be possible with the above-described couplers. This comprises a two-part body consisting of a main part 67 and a cap 69. The parts are formed to provide a cylindrical socket 71 (corresponding to socket 11) at the forward end of the coupler and a cylindrical chamber 73 (corresponding to chamber 13) which opens into the rearward end of the socket 71. At the forward or outer end of the socket the parts are formed to provide an internal annular recess generally designated 75. This recess has a cylindrical outer end portion 77 and a cylindrical inner portion 79 of larger diameter than portion 77. The cap fits over a reduced forward end portion 81 of part 67 and has its inner end 83 swaged into an annular exterior groove 85 in part 67. A seat 87, the same as that used in the Fig. 6 coupler, is received at its rearward end in the chamber 73. A washer 87 is slidable on the enlarged forward end portion 59 of seat 57. A spring 89 reacts from the shoulder 91 at the rearward end of reduced portion 81 against the washer to bias the washer against the shoulder 93 at the forward end of the large-diameter portion 79 of the recess 75. A split ring 33 is received in the small-diameter portion 77 of the recess and normally held therein by the washer under the bias of the spring 89. As before, this ring when unstressed has an outer diameter larger than the inside diameter of recess 75 (the diameter of the opening 95 in the outer end of the cap 69) and smaller than the diameter of portion 79 of the recess 75 (also smaller than the diameter of portion 77). The inside diameter of the ring when unstressed is smaller than the inside diameter of the recess. The part 67 has a socket 97 for a compression nut (not shown) and a passage 99 from socket 97 to chamber 73.

In applying the Fig. 8 coupler to a fitting 1, the ring 33 is pushed inward to rearward (to the left as viewed in Fig. 8) until it is within the large portion 79 of recess 75. Then the ring is expanded by the collar 7 of the fitting. The coupler is pushed forward to the point where the split ring 33 rides past the collar 7, thereby compressing the seat 57 as shown in Fig. 9, and allowing the ring to contract upon the undercut portion or neck 5 of the fitting and re-assume its position in portion 77 of the recess. This connects the coupler and fitting in such a way as to prevent the coupler from being twisted off the fitting.

It will be understood that the principles of the invention are applicable to angle couplers as well as to the straight couplers shown.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A coupler for permanently connecting a lubricant delivery line to a standard lubricant-receiving fitting of the type having an undercut coupler-receiving head, comprising a body formed to provide a cylindrical socket at one end thereof for receiving the head of a fitting and a passage from the other end of the body to the socket with a shoulder at the inner end of the socket, said body having an internal annular recess adjacent the outer end of the socket, the diameter of the recess increasing in the direction away from the outer end of the socket, a tubular rubber seat in the socket the outer end of which is engageable by the end of the head of a fitting received in the socket, and a split resilient ring in the recess, said ring being substantially narrower than the recess and, when unstressed, having an inside diameter smaller than the smallest diameter of the recess and an outside diameter larger than the smallest diameter of the recess and smaller than the largest diameter of the recess, said tubular rubber seat being axially compressible by a fitting upon assembly of the coupler therewith, said seat when uncompressed prior to assembly of the coupler with a fitting being of such length as to extend from said shoulder to adjacent the outer end of the socket and having its forward end engaging the ring and holding the ring in a plane located at the outer end of the socket substantially at right angles to the axis of the socket, the ring being confined between the forward end of the seat and the outer side of the recess, said recess having a surface portion at a wedging angle to the undercut on the head of the fitting whereby upon application of the body to the fitting, the ring is pushed back toward the inner side of the recess, then expanded by the head of the fitting, and then contracts behind said head, and whereby the seat is axially compressed to seal against the fitting and acts to bias the coupler in the direction away from the fitting so as to hold the ring wedged between the said surface portion and said undercut thereby permanently to hold the coupler tight on the fitting and to resist separation thereof.

2. A coupler as set forth in claim 1 wherein the body is a one-piece body and wherein the recess is formed by a counterbore at the outer end of the socket and an integral lip portion which surrounds the counterbore, the lip portion being of conical form convergent in the direction toward the outer end of the socket, the recess thereby having a periphery which flares in the direction away from the outer end of the socket.

3. A coupler as set forth in claim 1 wherein the body is a two-part body consisting of a main part and a cap, the cap being formed to provide the recess with the recess having an outer cylindrical end portion and an inner cylindrical portion of larger diameter, and wherein a spring is provided in said inner cylindrical portion for biasing the ring in outward direction.

References Cited in the file of this patent

UNITED STATES PATENTS

| | | |
|---|---|---|
| 1,754,639 | Meyer | Apr. 15, 1930 |
| 2,083,035 | Rogers | June 8, 1937 |
| 2,253,018 | Cowles | Aug. 19, 1941 |
| 2,362,880 | Campbell | Nov. 14, 1944 |
| 2,400,818 | Fox | May 21, 1946 |
| 2,429,782 | Versoy | Oct. 28, 1947 |
| 2,486,113 | Campbell | Oct. 25, 1949 |
| 2,638,362 | Sherman | May 12, 1953 |

FOREIGN PATENTS

| | | |
|---|---|---|
| 1,034,886 | France | Apr. 15, 1953 |